Dec. 28, 1943.                G. L. ROGERS                2,337,933
                        ELECTRIC CONTROL CIRCUIT
              Original Filed Oct. 31, 1941    2 Sheets-Sheet 1
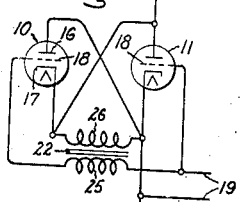
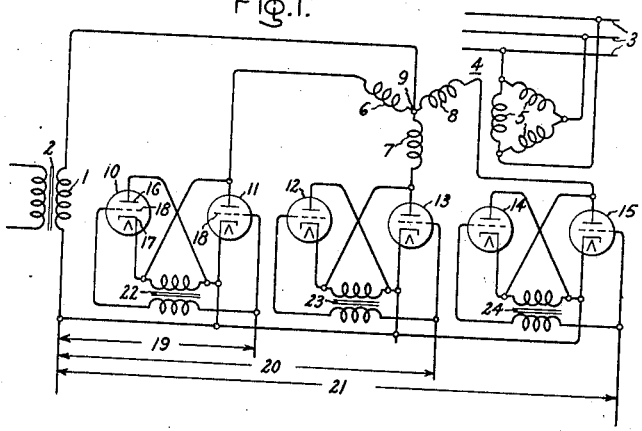
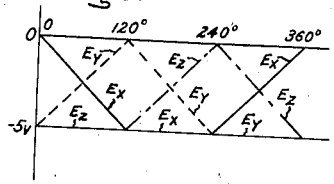
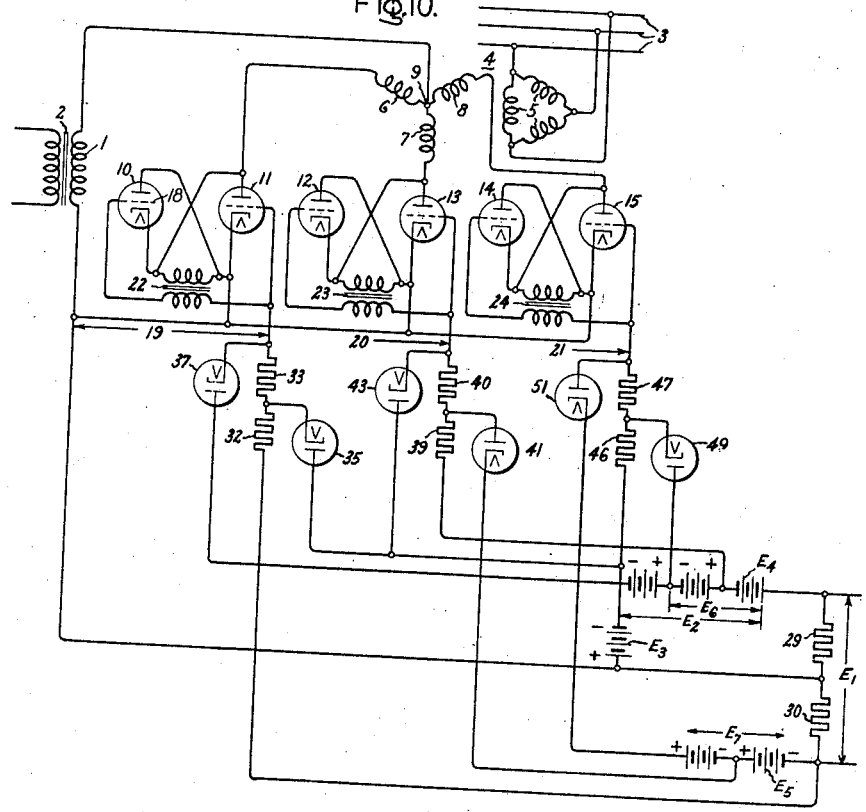
Inventor:
George L. Rogers,
by Harry E. Dunham
His Attorney.

Dec. 28, 1943.    G. L. ROGERS    2,337,933
ELECTRIC CONTROL CIRCUIT
Original Filed Oct. 31, 1941    2 Sheets-Sheet 2
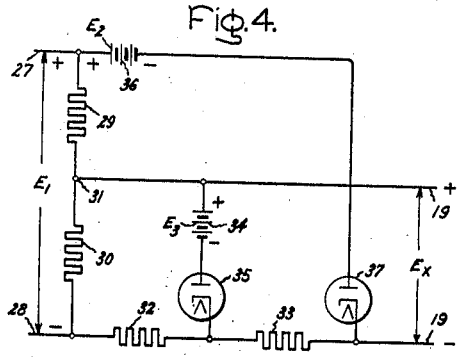
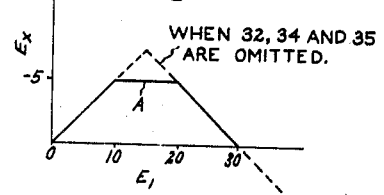
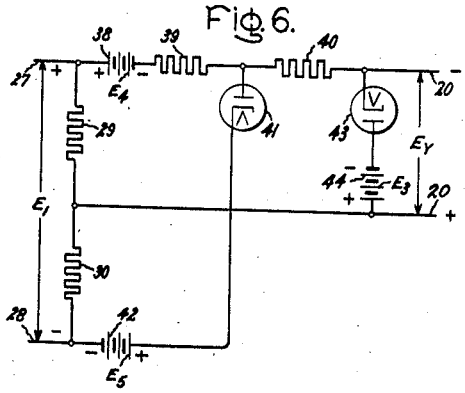
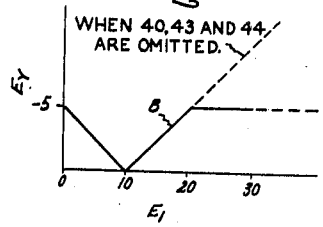
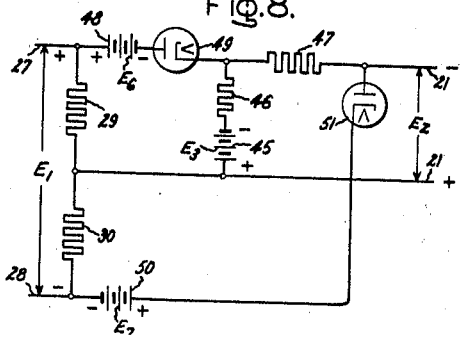
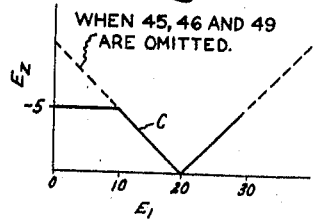
Inventor:
George L. Rogers,
by Harry E. Dunham
His Attorney.

Patented Dec. 28, 1943

2,337,933

UNITED STATES PATENT OFFICE 2,337,933

ELECTRIC CONTROL CIRCUIT

George L. Rogers, Schenectady, N. Y., assignor to General Electric Company, a corporation of New York Original application October 31, 1941, Serial No. 417,352. Divided and this application April 14, 1943, Serial No. 482,985

7 Claims. (Cl. 171—229)

My invention relates to electric control circuits and more particularly to improved electric circuits for producing a control voltage of predetermined characteristics from a source of voltage having a different characteristic. This application is a division of my copending application, Serial No. 417,352, filed October 31, 1941, and assigned to the assignee of this application.

It is often desirable to produce a voltage which varies in magnitude at different rates or in different directions for different portions of a complete range of variation of a supply voltage which may, for example, vary uniformly in one direction. If the supply circuit is controlled to produce a unidirectional voltage which increases steadily in magnitude, it may be desirable to produce a control voltage which increases steadily for a portion of the range of increase of supply voltage; remains constant for a second portion of the range of increase of supply voltage; and decreases through a third portion of the range of increase of supply voltage. In accordance with the teachings of my invention, I provide an improved control circuit for producing a control voltage the magnitude of which varies in different directions during different ranges of variation of a supply circuit voltage in one direction.

It is an object of my invention to provide new and improved electric control circuits.

It is another object of my invention to provide a new and improved control circuit for producing a control voltage from a supply voltage of variable magnitude which remains constant or varies in opposite directions as the supply voltage is varied progressively in one direction.

Briefly stated, in the illustrated embodiments of my invention, I have shown my invention applied to circuits for producing excitation voltages for the electric valves of a phase-shifting circuit from sources of unidirectional voltage, the magnitudes of which are increased progressively in one direction.

For a better understanding of my invention, reference may be had to the following description taken in connection with the accompanying drawings, and its scope will be pointed out in the appended claims. Fig. 1 of the drawings illustrates my invention as applied to a phase shifting arrangement for controlling the phase of the voltage applied to a single phase output or load circuit from a polyphase alternating current supply circuit. Fig. 2 represents an aspect of the control circuit shown in Fig. 1. Fig. 3 represents certain operating characteristics relative to the control of the respective pairs of electric discharge devices shown in Fig. 1. Figs. 4, 6 and 8 represent in detail portions of the respective excitation circuits connected to the three groups of electric discharge devices shown in Fig. 1; and Figs. 5, 7 and 9 represent certain operating characteristics of the control or excitation circuits shown in Figs. 4, 6 and 8, respectively. Fig. 10 represents a complete arrangement wherein the excitation circuits are shown connected to the phase shifting arrangement of Fig. 1.

Referring now to the arrangement shown in Fig. 1, I have there illustrated my invention as applied to a phase shifting circuit for controlling the phase of the voltage applied to an output circuit 1 which may include a transformer 2. The phase shifting circuit may be energized from a polyphase alternating current supply circuit 3 and includes a plurality of $n$ electrically displaced phase windings. Although not limited thereto, I have illustrated my invention as applied to a system which is energized from a three phase alternating current supply circuit and in which the electrically displaced windings are provided by a transformer 4 having a plurality of primary windings 5 and a plurality of electrically displaced secondary or phase windings 6, 7 and 8 having an electrically intermediate or neutral connection 9 which is connected to one terminal of the output circuit.

The phase shifting circuit also includes a plurality of variable impedance means such as $n$ pairs of reversely connected electric discharge devices 10, 11; 12, 13; 14, 15 which are connected to phase windings 6, 7 and 8, respectively. Electric discharge devices 10—15, inclusive, are preferably of the high vacuum type each including an anode 16, a cathode 17 and a control member or grid 18. The grids 18 of the discharge devices are connected to excitation circuits described in detail hereinafter and which are represented in Fig. 1 as comprising circuits 19, 20 and 21. It will be noted that the common junctures of the respective pairs of electric discharge devices are connected to one terminal of the load or output circuit 1.

I connect between the excitation circuits 19, 20 and 21 and the respective associated pairs of electric discharge devices transformers 22, 23 and 24 to control the conductivities of these discharge devices so that the pairs operate as an equivalent variable resistance in response to the variations in the grid voltages applied thereto. It will be noted that each of the discharge devices in the respective pairs is connected reversely, that is, having the anode of one connected to the cathode of the other, in order to transmit both half cycles of alternating current of the respective associated phase windings. Transformers 22—24 are preferably arranged to have a 1:1 ratio, thereby serving to maintain the grid and cathode of electric discharge devices 10, 12 and 14 at the same potential so that only the unidirectional excitation is effective. In this manner, the alternating component of voltage due to the connection to the anode-cathode circuit is effectively neutralized so far as each of the grid control or excitation circuits is concerned. Fig. 2 represents a portion of the circuit shown in Fig. 1 in which the aspects of the neutralization, by using the transformer connections of this nature, are more succinctly represented. It will be noted that the secondary winding 25 is connected across the grids 18 of electric discharge devices 10 and 11, and that the primary winding 26 is connected to the common junctures of the cathodes of the discharge devices. In this manner, the alternating components of voltage which are present in the anode-cathode circuits of the pairs of discharge devices is effectively eliminated from the grid circuits so that the discharge devices respond precisely to the magnitude of the unidirectional voltages of the control circuits.

The control circuits or excitation circuits 19—21 which I provide for selectively controlling the conductivities of the discharge devices 10—15, inclusive, include means, specifically described hereinafter, which are selectively responsive to a unidirectional control voltage and selectively control the conductivities of the different pairs in different manners in response to different magnitudes of the unidirectional control voltage. I provide this type of control in order to vary or control the phase of the output voltage supplied to output circuit 1. For example, I have found that if the conductivity of one of the pairs of electric discharge devices, such as discharge devices 10 and 11, is maintained substantially constant or at a zero value, the phase of the voltage supplied to the output circuit 1 may be varied throughout $$\frac{2\pi}{n}$$

electrical degrees by increasing the conductivities of the discharge devices 12 and 13 and decreasing the conductivities of the discharge devices 14 and 15. Furthermore, by progressing this sequence type of control to other groups of electric discharge devices, the phase of the voltage supplied to the output circuit may be shifted throughout an additional $$\frac{2\pi}{n}$$

electrical degrees and, lastly, by choosing another combination of discharge devices controlled in a corresponding manner, the shift in phase may be made throughout another $$\frac{2\pi}{n}$$

electrical degree interval thereby completing the phase shift throughout the complete $2\pi$ or 360 electrical degrees.

The diagram of Fig. 3 may be of assistance in explaining the manner in which the respective pairs of electric discharge devices shown in Fig. 1 may be controlled to obtain any desired shift in phase of the voltage supplied to output circuit 1. If the voltages of the excitation circuits 19, 20 and 21 be represented by the characters $E_x$, $E_y$ and $E_z$, respectively, and if it be assumed that the electric discharge devices are of the type which are rendered completely nonconducting by impressing on the grids 18 thereof a $-5$ volts, the relation of the shift in phase and the respective grid voltages may be represented by the curves shown in Fig. 3. By referring to these curves, it will be noted that during any one interval of time the conductivity of one pair of discharge devices is reduced to zero by impressing thereon a negative hold-off voltage of 5 volts and by concomitantly varying the conductivities of the other two pairs of electric discharge devices.

Figs. 4, 6 and 8 represent the excitation circuits which are connected to circuits 19, 20 and 21, respectively, of Fig. 1. These excitation circuits are energized from a common control circuit including a positive conductor 27 and a negative conductor 28, and the voltage of which is represented by the character $E_1$. These circuits are selectively responsive to the magnitude of the unidirectional voltage $E_1$ and control the magnitude of the bias voltages impressed on the grids 18 of the respective associated pairs of electric discharge devices.

Considering Fig. 4, I there provide an arrangement in which the voltage applied to circuit 19 varies in the manner indicated by the solid curve A of Fig. 5. It will be noted that the bias voltage $E_x$ increases to a negative maximum value upon increase of voltage $E_1$ to a predetermined value, and that the bias voltage remains substantially constant through a second region or range until the voltage $E_2$ attains a second predetermined value, and that the bias voltage progressively decreases in magnitude upon further increase of $E_1$ beyond the second predetermined value.

In order to obtain this type of control, I provide in Fig. 4 a circuit including a voltage divider comprising a pair of serially connected resistances 29 and 30 having a common juncture 31 which is connected to one conductor of circuit 19. To impress on circuit 19 a voltage which is zero when $E_1$ is zero and which progressively and linearly increases in magnitude until $E_1$ attains a predetermined value, I provide resistances 32 and 33 in series relation connected between the negative conductor 28 and one terminal of circuit 19. As the voltage $E_1$ increases, a proportionate voltage is transmitted to circuit 19. The component of voltage so transmitted is determined, of course, by the ratio of resistances 29 and 30. I have found that these resistances may, if desired, be made equal so that one-half the voltage $E_1$ is available for the control of the circuit 19. To maintain the voltage of circuit 19 substantially constant for the second range of voltage $E_1$, I employ a source of reference voltage, such as a battery 34 and a unidirectional conducting device 35, which are oppositely poled and connected to transmit current through resistances 30 and 32 when the voltage appearing across resistance 30 attains a value corresponding to the first predetermined value of $E_1$. Throughout the second range of $E_1$, the unidirectional conducting device 35 transmits current through resistances 30 and 32 to maintain the voltage transmitted to circuit 19 at a substantially constant value. I provide a second source of reference voltage, such as a battery 36 and a unidirectional conducting device 37, which are oppositely poled and connected in series relation between the positive conductor 27 and the resistance 33 to decrease progressively the magnitude of the bias voltage when $E_1$ increases in magnitude beyond the second predetermined value.

It will be understood that the operating characteristics shown in Fig. 5 represent the theoretical shape of the curve which would be obtained by assuming that no voltage appears across the unidirectional conducting devices. However, inasmuch as the devices necessitate the impression of a predetermined voltage thereacross, it will be appreciated that the curves actually when plotted from observed data will have somewhat rounded portions instead of the sharp characteristics shown. The upper dotted portion of the characteristics shown in Fig. 5 may be obtained and the characteristics changed by omitting the source of reference voltage or battery 34, resistance 32 and device 35.

The operation of the arrangement shown in Fig. 4 will be explained by considering the circuit upon a progressive increase in magnitude of $E_1$. During the first range of $E_1$, the voltage applied to circuit 19 increases progressively and linearly due to the rise in voltage across resistance 30. Upon attaining a predetermined value and for voltages within a predetermined range above that value, the voltage drop across resistance 30 is sufficient to overcome the voltage of battery 34, causing current to flow in a circuit including battery 34, device 35, resistance 30 and resistance 32. The voltage drop appearing across resistance 32 is sufficient to neutralize or counteract the rise in voltage appearing across resistance 30 occasioned by increase of voltage $E_1$, thereby maintaining the voltage supplied to circuit 19 substantially constant throughout a second range of $E_1$. When the voltage of $E_1$ increases to a second predetermined value, causing unidirectional conducting device 37 to conduct current, the magnitude of the voltage transmitted to circuit 19 is progressively decreased. During this region of operation current is conducted by battery 36, device 37, and resistances 33 and 32. Upon a decrease of $E_1$, curve A is traversed in the reverse direction.

Control circuit 20, shown in detail in Fig. 6, is constructed to produce a voltage having the characteristic of curve B in Fig. 7. In this arrangement I provide a source of voltage, such as a battery 38 and resistances 39 and 40 which transmit a voltage of predetermined value to circuit 20 when the value of $E_1$ is zero and which progressively decreases the magnitude of the voltage supplied to circuit 2 for increase of $E_1$ within the first range of $E_1$ by the transmission of current through resistances 39 and 40. When $E_1$ attains the predetermined value, the voltage supplied to circuit 20 is reduced to zero and upon a further increase of voltage of $E_1$ into the second range I provide a unidirectional conducting device 41 and a source of reference potential, such as a battery 42, which conduct greater amounts of current through resistance 39 to increase progressively the magnitude of the bias voltage $E_y$ until the voltage $E_1$ attains a second predetermined value. As a means for limiting the magnitude of the voltage supplied to circuit 20 upon increase of $E_1$ beyond the second predetermined value, I connect across circuit 20 a unidirectional conducting device 43 and a source of reference voltage such as a battery 44.

The voltage $E_y$ may be made to have the characteristic shown by the dotted line within the third region or range of operation by omitting resistance 40, unidirectional conducting device 43 and the source of voltage 44.

The circuit of Fig. 8 produces an output characteristic corresponding to curve C of Fig. 9. In this arrangement the voltage applied to circuit 21 is maintained substantially constant throughout the first range of $E_1$ by means of a source of voltage 45 and resistances 46 and 47. When $E_1$ attains a predetermined value, the magnitude of the bias voltage supplied to circuit 21 is progressively decreased throughout a second predetermined range of $E_1$ by means of a source of reference voltage 48 and unidirectional conducting device 49 which complete a circuit through resistance 46 and source 45. When $E_1$ attains a second predetermined value, the voltage supplied to circuit 21 is then progressively increased in magnitude by the provision of a source of reference voltage 50 and a unidirectional conducting device 51 which are connected in the manner shown from one terminal of circuit 21 to the negative conductor 28. Throughout this third mentioned range when the voltage $E_1$ attains or exceeds the second predetermined value, the voltage supplied to the circuit 21 is progressively increased due to the flow of current through device 51 and source 50.

The voltage $E_z$ may be made to have the characteristic indicated by the dotted line within the first range of voltage $E_1$ by omitting source 45, resistance 46 and unidirectional conducting device 49.

Although not limited to the particular range of applied voltages and output voltages, I have found that the circuits shown in Figs. 4, 6 and 8 operate very satisfactorily when the respective elements have the following values:

$E_1$=range from zero to 30 volts
$E_2$=15 volts
$E_3$=$E_4$=$E_5$=5 volts
$E_6$=$E_7$=10 volts
Resistance 29=resistance 30

Fig. 10 shows the circuit of Fig. 1 in combination with the excitation circuits of Figs. 4, 6 and 8 as connected to the respective associated pairs of electric discharge devices in order to obtain the variation in conductivities, represented by the curves of Fig. 3, in response to variations in magnitude of the voltage $E_1$. As the voltage $E_1$ progressively increases from zero to the first predetermined value, that is in the first range, discharge devices 14 and 15 are maintained nonconducting and the conductivities of electric discharge devices 12 and 13 are progressively increased and the conductivities of discharge devices 10 and 11 are decreased, thereby shifting the voltage applied to the output circuit 1 through 120 electrical degrees. Throughout the second range of voltage $E_1$, the discharge devices 10 and 11 are maintained nonconducting, and the conductivities of electric discharge devices 12 and 13 are progressively decreased, and the conductivities of discharge devices 14 and 15 are progressively increased. Throughout the third range, discharge devices 12 and 13 are maintained nonconducting and the conductivities of devices 14 and 15 are progressively decreased and the conductivities of discharge devices 10 and 11 are progressively increased to provide an additional 120 degree shift in phase. In this manner, the phase of the voltage impressed on the output circuit may be smoothly controlled throughout three consecutive or adjacent 120 electrical degree intervals, and the phase displacement of the output voltage may be accurately controlled or determined by the magnitude of the voltage $E_1$ which is impressed on all three of the excitation circuits. Upon decrease in the magnitude of voltage $E_1$, the output voltage is shifted in the opposite direction.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a direct current circuit for producing a variable unidirectional voltage, a voltage divider connected across said source and comprising a resistance having an intermediate connection, an electric circuit connected in circuit with one terminal of said direct current circuit and said intermediate connection, means connected to said electric circuit comprising a source of reference voltage, a resistance and a unidirectional conducting device connected in series across one of said resistances to permit an increase of the voltage applied to said electric circuit for variations of said variable voltage to a predetermined value and for maintaining the voltage applied to said electric circuit at a substantially constant value for variations in voltage exceeding said value.

2. In combination, a direct current circuit for producing a variable unidirectional voltage, a voltage divider connected across said source and comprising in series relation a pair of resistances, an electric circuit connected in circuit with one terminal of said direct current circuit and the common juncture of said resistances, a source of reference voltage, a third resistance and a unidirectional conducting device connected in series relation between said juncture and said one terminal to permit an increase of the voltage applied to said electric circuit for variations of said variable voltage to a predetermined value and for maintaining the voltage applied to said electric circuit at a substantially constant value for variations in said variable voltage within a range extending from said first mentioned predetermined value to a second predetermined value, and a second source of reference voltage, a resistance and a unidirectional conducting device connected in series relation between the other terminal of said direct current circuit to said one terminal of said electric circuit through said third resistance for reducing the voltage applied to said electric circuit for values of said variable voltage exceeding said second predetermined value.

3. In combination, a control circuit for producing a variable voltage, a voltage divider connected across said source and comprising in series relation a pair of resistances, an electric circuit connected in circuit with one terminal of said control circuit and the common juncture of said resistances, a source of reference voltage, a third resistance, and a unidirectional conducting device connected in series relation between said juncture and said one terminal to increase the voltage applied to said electric circuit for variations of said variable voltage to a predetermined value and for maintaining the voltage applied to said electric circuit at a substantially constant value for variations in said variable voltage within a range extending from said first predetermined value to a second value and a source of reference voltage, a resistance and a unidirectional conducting device connected in series relation from the other terminal of said control circuit to one terminal of said electric circuit for reducing the voltage applied to said electric circuit for values of said variable voltage exceeding said second predetermined value.

4. In combination, a direct current circuit for producing a variable unidirectional control voltage, a voltage divider comprising a pair of serially connected resistances connected across said direct current circuit, an electric circuit having a terminal connected to the common juncture of said resistances, a source of reference voltage and a resistance connected in series relation with one of the first mentioned resistances for supplying to said electric circuit a voltage having a predetermined value when the value of said variable unidirectional voltage is zero, a second source of reference voltage, a resistance and a unidirectional conducting device connected across said direct current circuit for increasing the voltage applied to said electric circuit for variations in said variable unidirectional voltage from said predetermined value to a second predetermined value, and a third source of reference voltage and a unidirectional conducting device connected across said electric circuit for limiting the voltage applied to said electric circuit for values of said variable unidirectional voltage exceeding said second predetermined value.

5. In combination, a control circuit for producing a variable control voltage, a voltage divider comprising a pair of serially connected resistances connected across said control circuit, an electric circuit having a terminal connected to the common juncture of said resistances, a source of reference voltage, and a resistance connected in series relation with one of the first mentioned resistances for supplying to said electric circuit a voltage having a predetermined value when the control voltage is zero, a second source of reference voltage, a resistance and a unidirectional conducting device connected across said control circuit for increasing the voltage applied to said electric circuit for variations in said variable voltage from said predetermined value to a second predetermined value, and a third source of reference voltage and a unidirectional conducting device connected across said electric circuit for limiting the voltage applied to said electric circuit for values of said variable voltage exceeding said second predetermined value.

6. In combination, a direct current circuit for producing a variable unidirectional voltage, a voltage divider connected across said direct current circuit and comprising a pair of serially connected resistances, an electric circuit connected to the common juncture of said pair of resistances, means comprising a source of reference voltage connected to said electric circuit, a second source of reference voltage, a resistance and a unidirectional conducting device connected across one of the first mentioned resistances for decreasing the voltage applied to said electric circuit when said variable unidirectional voltage attains a predetermined value and for decreasing the magnitude of the voltage applied to said electric circuit within a region extending from said predetermined value to a second predetermined value, and a third source of reference voltage, a resistance and a unidirectional conducting device connected in series relation between the first mentioned device and one terminal of said direct current circuit for increasing the voltage applied to said electric circuit for values of said variable unidirectional voltage exceeding said second predetermined value.

7. In combination, a control circuit for producing a variable control voltage, a voltage divider connected across said control circuit and comprising a pair of serially connected resistances, an electric circuit connected to the common juncture of said pair of resistances, means comprising a source of reference voltage connected to said electric circuit, a second source of reference voltage, a resistance and a unidirectional conducting device connected across one of the first mentioned resistances for decreasing the voltage applied to said electric circuit when said control voltage attains a predetermined value and for decreasing the magnitude of the voltage applied to said electric circuit within a region extending from said predetermined value to a second predetermined value, and means for increasing the voltage applied to said electric circuit for values of said control voltage exceeding said second predetermined value comprising a third source of reference voltage, a resistance and a unidirectional conducting device connected in series relation between one terminal of said control circuit and one terminal of said electric circuit.

GEORGE L. ROGERS.